Jan. 18, 1949.  R. M. THORSON  2,459,202
PARKING INDICATOR
Filed Aug. 10, 1945
2 Sheets-Sheet 1
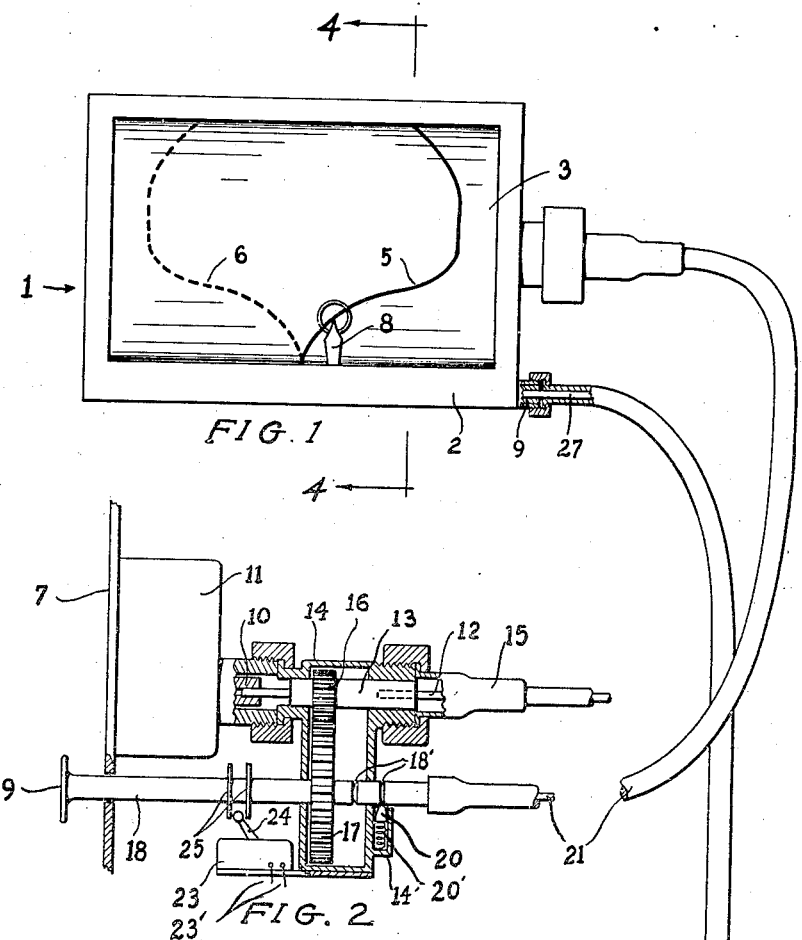
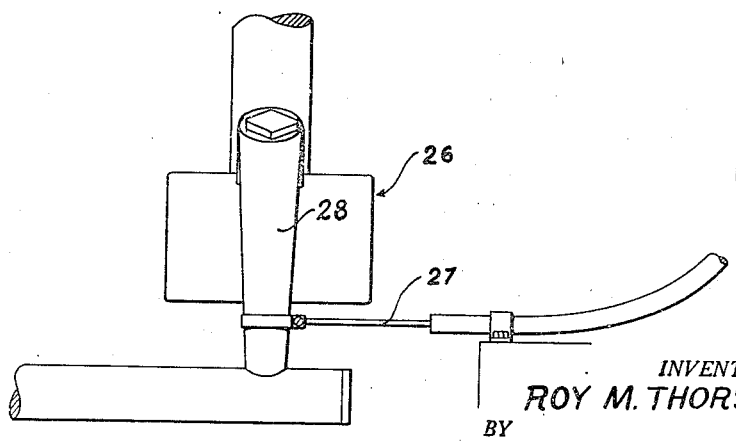
INVENTOR.
ROY M. THORSON
BY
Harry C. Schroeder Jan. 18, 1949. R. M. THORSON 2,459,202
PARKING INDICATOR
Filed Aug. 10, 1945 2 Sheets-Sheet 2
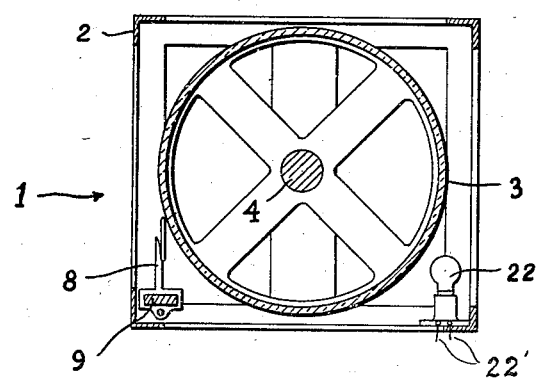
FIG. 4
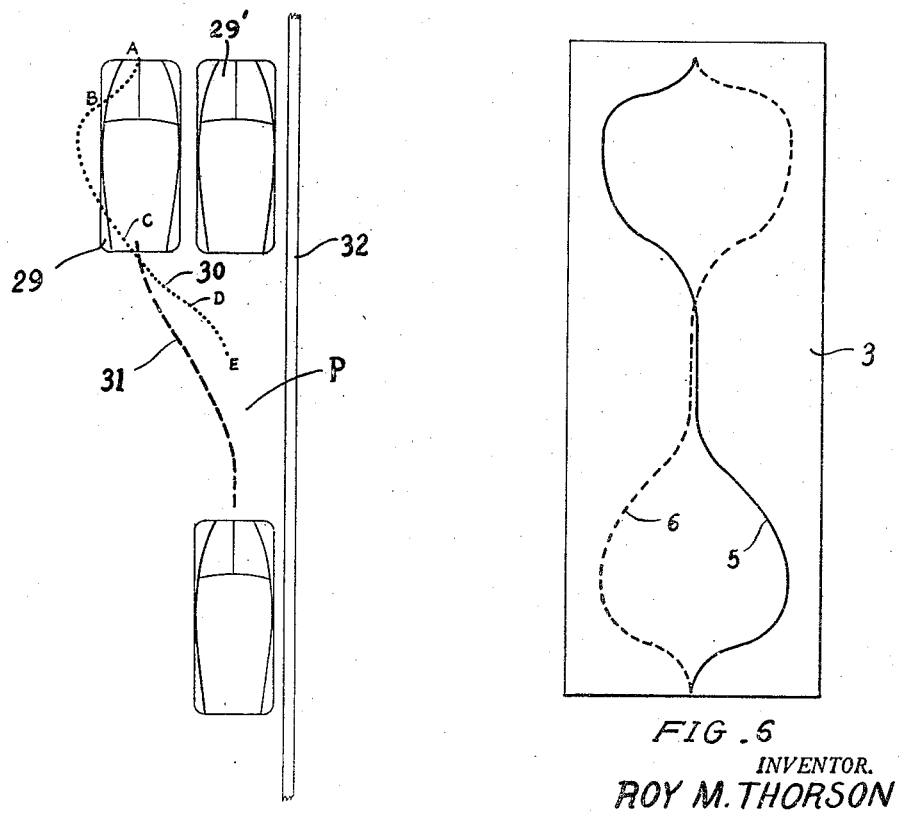
FIG. 5
FIG. 6
INVENTOR.
ROY M. THORSON
BY
Harry C. Schmidt Patented Jan. 18, 1949

2,459,202

UNITED STATES PATENT OFFICE 2,459,202

PARKING INDICATOR

Roy M. Thorson, Richmond, Calif.

Application August 10, 1945, Serial No. 610,114

7 Claims. (Cl. 116—31)

1

This invention relates to a parking guide for motor vehicles; the main object being to provide a device for the purpose which includes a rotary drum having guide lines representing the path the vehicle should follow when backing into a parallel parking space, and an indicator to follow said line; the drum and indicator being so connected to the wheels of the vehicle and to the steering mechanism respectively, that the driver, when running the car backward and steering the car so that the indicator continually registers with the corresponding guide line, can promptly and efficiently park his car in the desired space.

Fig. 1 is a front view of the parking guide as seen by the operator of the vehicle.

Fig. 2 is a partial section through the speedometer takeoff mechanism.

Fig. 3 is an elevation of the steering takeoff arrangement.

Fig. 4 is a transverse section along line 4—4 of Fig. 1.

Fig. 5 is a diagram showing the path of travel of the vehicle during the parking operation.

Fig. 6 is a view of the circumference of the drum of the parking guide, as if laid flat.

Referring to the characters of reference on the drawings; the parking guide unit 1 includes a rectangular frame 2 having a drum 3 of suitable translucent material therein and extending transversely of the vehicle. The drum is provided with an axial shaft 4 suitably journaled in the frame.

Marked on the surface of the drum and extending throughout its circumference are separate and distinctive guide lines 5 and 6; for parking on the right and left hand sides of a street respectively.

Each line is of predetermined form being plotted by experiment to fit the needs and according to the wheel-base length and other features of different motor vehicles.

The unit 1 is mounted in association with the instrument panel 7 in such position as to be readily visible to the driver of the car.

Arranged to cooperate with lines 5 or 6 alternately is an indicator preferably in the form of a ringed arrow or pointer 8. This pointer is slidable along a bar 9 mounted in housing 2 in a concealed position in front of and below the drum, and so that the pointer is substantially tangent to the drum as shown in Fig. 4.

The drum is connected to the speedometer mechanism, to be rotated thereby when the car is in motion and said mechanism is operating, by the following means: The rigid stub drive-shaft 10 of the speedometer 11 is disconnected from its

2 flexible shaft 12 and a short shaft 13 is interposed therebetween and couples the same in driving relation. The shaft 13 is mounted in a housing 14 secured to the speedometer casing and to the casing 15 in which shaft 13 is enclosed as shown in Fig. 2.

Fixed on shaft 13 is a pinion 16 arranged to mesh with a gear 17 fixed on a countershaft 18 slidably mounted in housing 14 parallel to shaft 13. Shaft 18 projects thru panel 7 and has a finger knob 19 thereon. A detent 20 is supported with a spring 20' in a socket 14'. The detent 20 may be forced into either of the grooves 18' and acts on shaft 18 to yieldably maintain the same in either one of two positions. When said shaft is pulled back, the gear 17 and pinion 16 are in mesh, and when said shaft is pushed forward, the gear 17 is moved clear of the pinion 16. Shaft 18 is connected by a flexible housed shaft unit 21 of conventional type with one end of drum shaft 4.

It will therefore be seen that the drum may be selectively placed into or out of driving relation with the speedometer shaft by a pull or push on shaft 18.

In addition, an electric light bulb 22 in housing 2 behind the drum, is turned on or off by the movement of shaft 18 as above described by means of a topple switch 23 in the circuit of the bulb and fixed on housing 14 and having its operating lever 24 projecting between a pair of discs 25 on shaft 18 and forming a shifting yoke. The switch is closed when the pinion 16 and gear 17 are in mesh, and the current flows through wiring 23' to the wiring 22' leading to light bulb 22.

The pointer 8 is slid back and forth by the turning of the front wheels of the car upon manipulation of the steering mechanism 26, by means of a flexible housed wire 27 strapped at one end to the usual steering arm 28 of such mechanism and at the other end to bar 9.

To place the device in operation, when it is desired to back into a parking space and the car is in position to start the parking movement, it is only necessary to pull on knob 19, preferably with a slight twisting movement, which places gear 17 into mesh with pinion 16. Then when the car is started (placing the speedometer in operation) and the drum slowly rotates, steering of the car so that the pointer follows line 5 will insure the car being properly backed into the chosen space without the operator having to watch anything but the parking guide. This is because, as previously stated, the guide line 5 is laid out or plotted by previous test or experiment to give the desired car movement. The speed of rotation of drum 3 relative to car movement is such that the drum will make one revolution with a car movement of about one and one-third times its length, this being the average movement of a car during a parking operation.

If necessary at the outset, the operator can rotate the drum to a proper starting position, or so that the starting point of line 5 (or line 6) is just visible at the bottom of frame 2. This is done by pushing in on knob 19 and then turning the same.

Fig. 5 illustrates diagrammatically the initial position, and subsequent path of movement of a car 29 being parked; dotted line 30 indicating the path of the front center of the car while being parked, and dash line 31 indicating the path of the rear center of the car.

Prior to a parking movement, car 29 is positioned alongside car 29' (or the space for the same) just ahead of the parking space P as shown.

The parking guide being set and then placed in operation as previously described, the car 29 is backed, while at the same time pointer 8 is made to follow line 5 by first turning the car wheels hard to the right from starting point A, as indicated at B on line 30.

The car will then be moved straight back for a short distance (though at an angle to curb 32) as indicated at C. The wheels are then turned hard left as at D, and then straightened out, stopping at point E. The car will then be properly parked in space P providing that during the parking operation, the driver has manipulated the steering wheel so that the pointer closely follows line 5 throughout its length, which is one full revolution of the drum.

Line 5 is for right-side parking while line 6 is for left-side parking should this ever be desired.

If necessary, line 5 may be plotted to suit the needs of parking operations where the parking spaces are short and sundry backward and forward movements of the car are necessary to properly park the car.

I claim:

1. A parking guide for a motor vehicle comprising a drum turnably mounted in a visible location on the vehicle with its axis transversely thereof, a deviating line marked on the drum circumferentially thereof and representing the path of movement of the vehicle when backing into a parking space, means connecting the drum with a moving part of the vehicle to rotate the drum not more than a full revolution upon a complete parking movement of the vehicle, said means being adapted for ready installation on a standard automobile, a pointer mounted in connection with the drum for movement axially thereof and adapted to read on the line and means connecting the pointer with the steering mechanism of the vehicle and being adapted to maintain the pointer in register with said deviating line by manipulation of the steering mechanism.

2. A device as in claim 1, in which said last named means comprises a flexible push and pull wire connected to the pointer and to the steering arm of the steering mechanism; said wire extending axially of the drum for a certain distance from the pointer.

3. A device as in claim 1, in which said drum connecting means comprises a flexible drive shaft connected at one end to one end of the drum, and a driving connection between the other end of said shaft and the drive shaft of the speedometer of the vehicle.

4. A device as in claim 1, in which said drum connecting means comprises a flexible drive shaft connected at one end to one end of the drum, and a driving connection between the other end of said shaft and the drive shaft of the speedometer of the vehicle, said connection comprising a pinion driven by the speedometer shaft, and a meshing gear fixed on the first named shaft.

5. A device as in claim 1, in which said drum connecting means comprises a flexible drive shaft connected at one end to one end of the drum, and a driving connection between the other end of said shaft and the drive shaft of the speedometer of the vehicle, the flexible drive shaft having a rigid shaft section mounted parallel to and adjacent the speedometer end of the speedometer drive shaft, a pinion axial with and driven by said drive shaft at said end thereof and a gear on the rigid shaft section to mash with the pinion.

6. A device as in claim 1, in which said drum connecting means comprises a flexible drive shaft connected at one end to one end of the drum, and a driving connection between the other end of said shaft and the drive shaft of the speedometer of the vehicle, the flexible drive shaft having a rigid shaft section mounted parallel to and adjacent the speedometer end of the speedometer drive shaft, a pinion axial with and driven by said drive shaft at said end thereof and a gear on the rigid shaft section to mesh with the pinion and manual means to place the gear into and out of mesh with the pinion.

7. A device as in claim 1, in which said drum connecting means comprises a flexible drive shaft connected at one end to one end of the drum, and a driving connection between the other end of said shaft and the drive shaft of the speedometer of the vehicle, the flexible drive shaft having a rigid shaft section mounted parallel to and adjacent the speedometer end of the speedometer drive shaft, a pinion axial with and driven by said drive shaft at said end thereof and a gear on the rigid shaft section to mesh with the pinion, and means mounting the rigid shaft section for sliding movement manually to place the gear into and out of mesh with the pinion at will.

ROY M. THORSON.

REFERENCES CITED

The following references are of record in the file of this patent:

UNITED STATES PATENTS

| Number | Name | Date |
|---|---|---|
| Re. 18,830 | Glennon | May 16, 1933 |
| 1,809,934 | Glennon | June 16, 1931 |
| 1,905,717 | Jackson | Apr. 25, 1933 |
| 2,151,579 | Bacon | Mar. 21, 1939 |
| 2,373,168 | Cockerell | Apr. 10, 1945 |